J. O. MICHAUD.
FRICTION TRANSMISSION MECHANISM.
APPLICATION FILED MAR. 1, 1917.
1,258,034.
Patented Mar. 5, 1918.
3 SHEETS—SHEET 2.
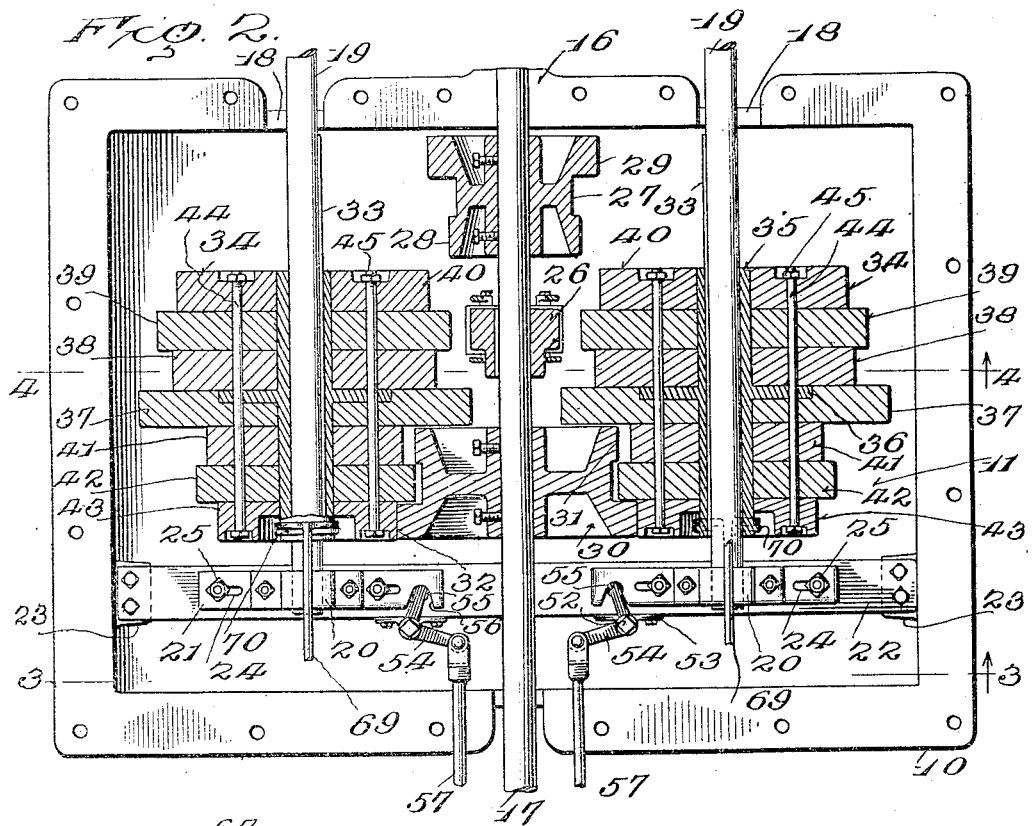
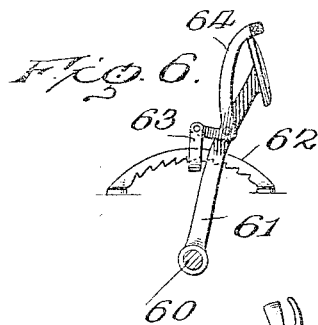
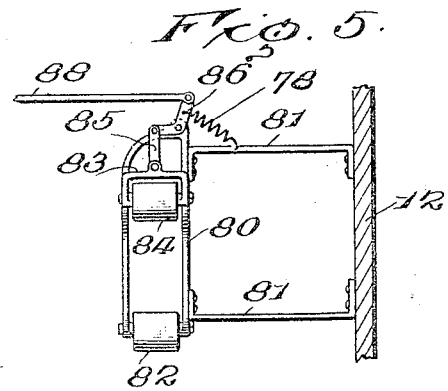
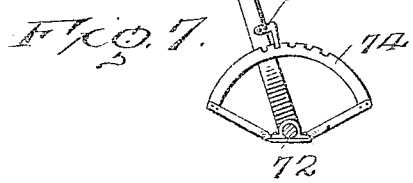
Inventor
J. O. Michaud
By
Attorneys

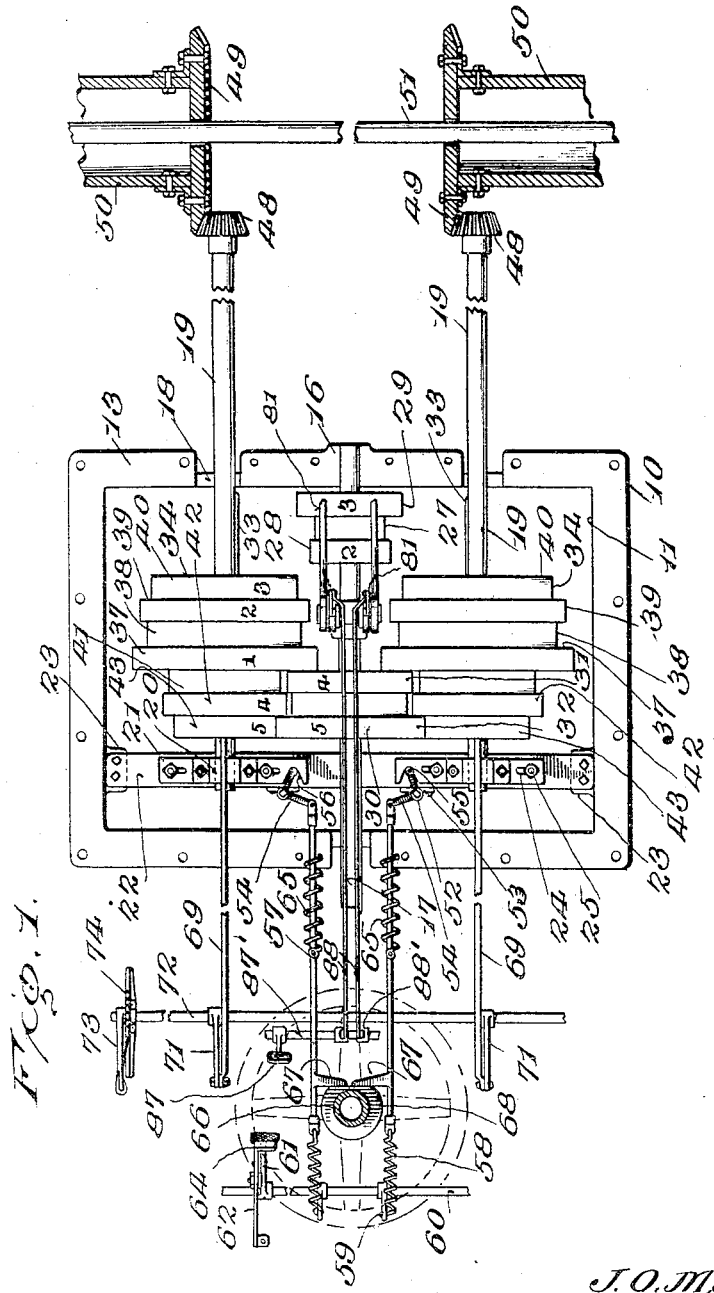

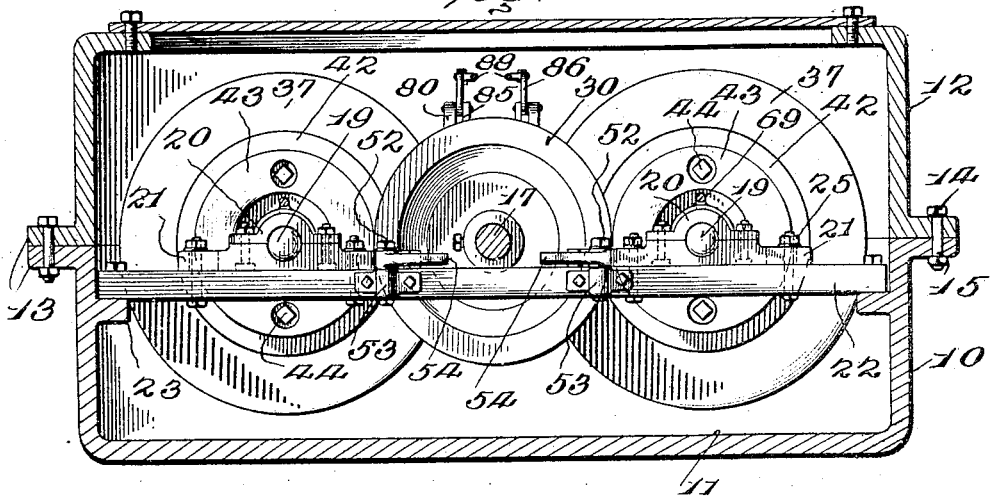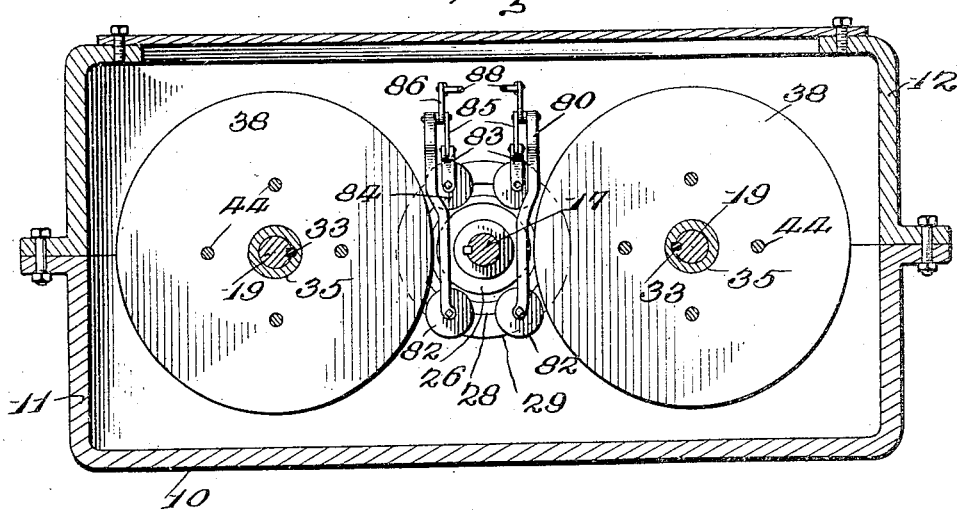

UNITED STATES PATENT OFFICE.

JOSEPH O. MICHAUD, OF FORT KENT, MAINE.

FRICTION TRANSMISSION MECHANISM.

1,258,034.  Specification of Letters Patent.  Patented Mar. 5, 1918.

Application filed March 1, 1917. Serial No. 151,778.

*To all whom it may concern:*

Be it known that I, JOSEPH O. MICHAUD, a citizen of the United States, residing at Fort Kent, in the county of Aroostook and State of Maine, have invented certain new and useful Improvements in Friction Transmission Mechanism, of which the following is a specification.

My invention relates to new and useful improvements in friction transmissions and more particularly to friction transmissions for use upon self-propelled vehicles of the traction engine type in which a wide range of rates of drive is desirable, one of the primary objects of my invention being the provision of a transmission mechanism which shall be relatively compact and by means of which a large number of drive ratios are provided.

Another object which I have in view is the provision of an improved form of friction drive mechanism which shall do away with the use of gears which are liable of injury while being moved in and out of mesh.

In this connection, another object which I have in view is to so arrange the transmission mechanism that power will be independently supplied to the drive wheels of the vehicle in such a manner that ordinarily the same amount of power will be supplied to both wheels, while when the vehicle is turning, the supply of power to the inner wheel will be cut off. I aim to accomplish this without the employment of any differential mechanism, the turning of the steering column acting upon the transmission itself to move certain friction elements in and out of engagement with each other.

More specifically, I provide a transmission mechanism in which a number of friction elements or disks are fixed upon the drive or engine shaft and are selectively engageable by friction elements or disks fixed upon driven shafts disposed one at either side of the engine shaft, the disks on one driven shaft being a duplicate of those on the other and each shaft transmitting power to one of the rear wheels of the vehicle.

In this connection, a still further object which I have in view is the provision of a novel and simple mechanism for selectively bringing the drive disks of the driven shafts into operative engagement with the corresponding disks of the engine shaft.

With these and other objects in view, my invention will be more fully described, illustrated in the accompanying drawings, and then specifically pointed out in the claims which are attached to and form a part of this application.

In the drawings:

Figure 1 is a plan view of my improved transmission mechanism and the controlling mechanism therefor, the upper portion of the transmission casing being removed and certain parts being shown in section;

Fig. 2 is a similar view of the transmission mechanism itself upon a somewhat larger scale with the friction elements themselves in section;

Fig. 3 is a vertical sectional view taken on the line 3—3 of Fig. 2, looking in the direction of the arrows;

Fig. 4 is a corresponding section taken on the line 4—4 of Fig. 2, also looking in the direction of the arrows;

Fig. 5 is a fragmentary elevation of a portion of the reversing mechanism;

Fig. 6 is a detail view of a pedal employed for locking the friction elements of the driven shafts in engagement with the friction elements of the engine shafts;

Fig. 7 is a detail view of a hand lever and notched segment employed in controlling the transmission mechanism.

Corresponding and like parts are referred to in the following description and indicated in all the views of the drawings by the same reference characters.

My improved transmission mechanism proper is inclosed in any suitable housing 10 which is preferably rectangular in shape and which includes a lower section 11 and upper section 12 provided about their marginal edges with mating flanges 13 through which are passed bolts 14 in order that the sections may be secured together by nuts 15. The abutting edges of the front and rear walls of the casing sections are formed to provide alined bearings 16 for the engine or drive shaft 17 and are cut-away to provide openings 18 at the rear of the casing through which driven shafts 19, disposed in spaced relation to the engine shaft 17 and one at either side thereof, project. These driven shafts, at their forward ends, are journaled in bearings 20 carried by plates 21 which are supported upon the upper face of a transverse beam 22, the ends of which are bolted to flanges 23 formed interiorly of the lower casing section 11. Each of these plates, at each side of its bearing, is formed with a longitudinally extending slot 24 and bolts 25 are passed through these slots and threaded into the beam so that the plates are mounted for reciprocation toward and away from the drive shaft 17.

Fixed to the engine shaft 17, at a point substantially midway between the front and rear walls of the casing 10, is a friction disk 26 which constitutes the first or low speed friction drive element of the engine shaft and upon which the numeral 1 is, therefore, inscribed to insure a clear understanding of the transmission. Fixed upon the same shaft adjacent the rear wall of the casing is a compound friction drive element 27 including a friction disk 28 of somewhat greater diameter than the disk 26 and a friction disk 29 of still larger diameter, the two being connected by an integrally formed hub. Also fixed upon the shaft 17 at a point near the front of the casing is a second compound friction element 30 including a friction drive disk 31 somewhat greater in diameter than the disk 29 and a friction drive disk 32 of still greater diameter. The disks 28, 29, 31 and 32 constitute the second, third, fourth and fifth speed disks and are correspondingly inscribed.

Fixed upon the shafts 19 to rotate therewith by means of keys 33 are compound friction drive elements or drums, each indicated as a whole by the numeral 34. Each of these drums includes a hub 35 having a keyway to receive the key 33 and provided intermediate its length with an annular flange 36. Mounted upon this hub is a friction disk 37 which has its rear face recessed to seat the flange 36 and which is adapted, in practice, to engage the disk 26 of the engine shaft to transmit power at low speed. Next to this and engaging against the opposite side of the flange 36 is a spacer disk 38 against which engages a friction disk 39 proportioned to coöperate with the friction disk 28. A further friction disk 40 engages against the outer face of the disk 39 and is proportioned to coöperate with the friction disk 29. Also mounted upon the hub and abutting against the forward face of the disk 37 is a spacer disk 41 against which engages a friction disk 42 proportioned to coöperate with the friction disk 31, while a friction disk 43 engages against the disk 42 and is proportioned to engage against the disk 30 of the engine shaft. A plurality of tie bolts 44 are passed through all of these disks and through the flange 36 and secured by nuts 45 so that all of the disks are clamped to each other and to the hub 35 to turn therewith. Both of the drive elements or drums 34 are of the same construction and this description of one will, therefore, suffice for both. Each of the friction disks of these drums bears, in the drawings, the number corresponding to its speed ratio and, consequently, to the number borne by the coöperating friction disk of the engine shaft 17. All of the friction disks of all shafts are constructed of suitable friction material, such as paper, wood, leather or the like. The friction disks of the power or engine shaft should, however, be of different material than those of the driven shafts so that engaging friction disks will in all cases be of different material.

The driving drums 34, as will be clearly seen by reference to Fig. 1 of the drawings, have their friction disks so arranged that a slight swinging movement of the shafts 19 away from the shaft 17 will permit free reciprocation of the driving drums from one end of the housing or casing to the other to bring any desired driving disk of each drum into transverse alinement with the coöperating driving disk of the shaft 17 when return swinging of the shafts 19 will bring such disks into engagement so that power may be transmitted from the shaft 17 to the shafts 19.

In practice, the driven shafts 19 are journaled in any suitable bearings carried by the vehicle frame and, at their rear ends, carry beveled pinions 48 meshing with beveled gears 49 fixed to the hubs 50 of traction wheels which are loosely mounted upon the rear axle 51 of the vehicle.

As a means for swinging the shafts 19 toward and away from the engine shaft, I provide vertical stub shafts 52 journaled in bearings 53 secured to the forward face of the beam 22 at either side of the engine shaft 17 and carrying bell crank levers 54. Each bell crank lever has one arm provided with a rounded head or terminal 55 which fits in a notch or seat 56 formed in the forward edge of the adjacent plate 21 near its inner end. Drag links 57 connect the opposite ends of these levers with stiff helical springs 58 which are in turn connected to crank arms 59 upon a rock shaft 60. A foot pedal 61 is fixed to this rock shaft and swings past a notched segment 62. A pawl forming stirrup 63 coöperates with this segment and is carried by one arm of a bell crank lever 64 which is pivoted to the shank of the pedal and the opposite arm of which projects slightly beyond the upper portion of the foot piece of the pedal so that it may be engaged by the toe of the operator at any time to cause release of the pedal. When this pedal is forced ahead and locked by the pawl 63, the shafts 19 are held in their innermost position so that a certain friction disk of each of such shafts will engage a corresponding friction disk of the engine shaft 17. Upon release of the pedal, the shafts will be swung away from each other by springs 65.

Preferably, the draw rods 57 extend for wardly, one at either side of the steering column 66 of the vehicle and immediately at the rear of this column carry inwardly projecting fingers 67 which engage against the flattened face of a cam collar 68 fixed to the steering column when the steering gear is in such a position that the vehicle is proceeding straight ahead. Obviously, turning of the steering column in either direction to cause change of direction of the vehicle will act through the cam to force that draw rod upon the side of the vehicle toward which the turn is to be made rearwardly and so swing the driven shaft 19 at that side of the vehicle to bring its friction element out of engagement with any of the friction disks of the engine shaft 17 so as to cut off transmission of power to the inner of the rear wheels. This, however, will in no way affect the transmission of power to the other rear wheel.

As a means for reciprocating the friction drums 34, I provide shifter rods 69 which are reciprocably mounted in the front wall of the casing and which, at their rear ends, have depending fingers to receive between them flanges 70 formed upon the forward ends of the hubs of the friction drums. The forward ends of these shifter rods are connected to crank arms 71 carried by a rock shaft 72 and a hand lever 73 is fixed to this shaft and swings over a notched segment 74, having a hand latch 75 for engagement with the teeth of the segment. Preferably, the segment is provided with as many notches as there are positions of the transmission mechanism in order that the operator may readily determine the condition of the friction transmission from a glance at the position of the lever.

In order to provide a reverse drive for my transmission mechanism, a pair of substantially U-shaped hangers 80 are supported one at either side of the engine shaft 17 with their sides projecting on either side of the friction disk or wheel 26. These hangers are supported from the casing by spring arms 81, for a reason which will be later explained, and at their lower ends carry friction rollers 82 which normally lie somewhat below the friction wheel 26. A yoke 83 carrying a friction roller 84 is supported by a link 85 from one arm of a bell crank lever 86 which is pivoted to the intermediate portion of each hanger so that the friction rollers 84 normally hang somewhat above the friction wheel 26, being supported in neutral position by a spring 78. Rods or links 88 connect the free arms of the bell crank levers with crank arms 88' carried by a rock shaft 87' which may be swung by a foot pedal 87. If the friction drums 34 are moved rearwardly to bring their friction disks 37 into transverse alinement with the friction wheel 26 and the shafts 19 are swung inwardly so that the disks 37 just clear this wheel, movement of the reversing pedal 87 will cause a reverse drive of the shafts 19. This is due to the fact that the rods 88 will act to swing the bell crank levers and force the upper friction rollers 84 downwardly against the peripheries of the friction disks and wheel when further movement of the levers will act to draw the rollers 82 upwardly into corresponding engagement with the drive elements. The spring arms 81 forming a yieldable support for these rollers and coacting mechanisms permit this movement so that all four rollers, during straight backing, may be wedged between the friction disks and the friction wheel and serve as idlers to transmit power from the wheels to the disk in a direction opposite to that in which it would be transmitted if the disks directly engaged the wheel, as is the case in the low speed drive of the transmission. When backing in a curve, however, only one pair of rollers will engage between the friction wheel and adjacent friction disk, the other friction disk being too far removed at that time to be engaged by the other pair of rollers, due to the action of the cam carried by the steering column the same as in the case of a forward drive around a curve.

From the foregoing description, taken in connection with the drawings, the operation of my improved friction drive mechanism may be readily understood. To place the transmission mechanism in neutral, it is only necessary to release the foot pedal 61 so that the springs 65 will swing the shafts 19 outwardly away from each other. To bring the mechanism into low or first speed position, the hand lever 73 is swung to move the friction drums to such a position as to bring their disks 37 in alinement with the friction wheel 26 and then the foot pedal 61 is pressed forwardly and locked to swing the shafts 19 toward each other and bring the friction disks into engagement with the wheel. Any desired forward speed setting may be made by repeating this operation, the foot pedal being first released to return the mechanism to neutral, the hand lever being then swung to bring the proper friction disks in alinement with the proper friction elements of the drive shaft and the foot pedal again swung to bring such elements into engagement. The manner of obtaining the reverse drive has been previously described.

Although I have illustrated and described my invention in all its details of construction, it will of course be understood that I do not wish to limit myself to such details but reserve the right to make any changes within the scope of the appended claims, without in the slightest degree departing from the spirit of my invention.

Having thus described the invention, what is claimed as new is:

1. In a transmission mechanism, a power shaft, a plurality of friction disks of different diameters fixed to the power shaft, driven shafts disposed one at either side of the power shaft, friction drums keyed one upon each driven shaft and movable longitudinally of its shaft, each friction drum including a plurality of independent friction surfaces of differing diameters for selective engagement with the friction disks of the power shaft, the driven shafts being free for limited lateral swinging movement, means normally holding the driven shafts away from the power shaft, manually operable means, including resilient connections, for simultaneously swinging the driven shafts toward the power shaft and holding them in such position, a steering column, and means co-acting between the steering column and the shaft swinging means whereby turning of the steering column in either direction will cause expansion of one of the resilient connections to permit movement of one of the driven shafts away from the power shaft.

2. In a transmission mechanism, a power shaft, a friction disk fixed thereon, a pair of driven shafts disposed one at either side of the power shaft and each having a friction disk rotatable with it and adapted to aline with the friction disk of the power shaft, means for swinging the driven shafts toward and away from each other whereby their friction disks may be brought into engagement with the friction disk of the power shaft to cause simultaneous rotation of the driven shafts, in one direction, and means capable of coöperation between the friction disks of the driven shafts and the friction disk of the power shaft whereby the driven shafts will be counterrotated, said means including resilient supporting brackets, yokes supported by the brackets with their arms extending upon opposite sides of the friction disk of the power shaft, one yoke being disposed at each side of the power shaft, friction rollers supported by the free ends of the yokes, bell crank levers pivoted to the opposite ends of the yokes, supplemental yokes swingingly supported each by one arm of one of the bell crank levers, friction rollers carried by the supplemental yokes, and means for causing simultaneous swinging of the bell crank levers to force all of the friction rollers into simultaneous engagement with the friction disks whereby power will be transmitted from the friction disk of the power shaft through the rollers to the friction disks of the driven shafts.

3. In a transmission mechanism, a power shaft, a pair of driven shafts disposed one at either side of the power shaft, power transmitting elements upon all of the shafts whereby power may be transmitted by the power shaft to both driven shafts, means for longitudinally shifting the power transmission elements of the driven shafts to bring them selectively into coöperative relation with the elements of the power shaft, and means for simultaneously swinging the driven shafts laterally toward and away from the power shaft to cause proper engagement of the power transmitting elements, said means including slide members journaling the driven shafts and formed with notches, bell crank levers each having one arm engaged in the notch of one of the members, a foot pedal controlled rock shaft, crank arms on the rock shaft, and yieldable connection between the crank arms and the free arms of the bell crank levers.

4. In a transmission mechanism, a power shaft, a pair of driven shafts disposed one at either side of the power shaft, power transmitting elements upon all of the shafts whereby power may be transmitted by the power shaft to both driven shafts, means for longitudinally shifting the power transmission elements of the driven shafts to bring them selectively into coöperative relation with the elements of the power shaft, and means for simultaneously swinging the driven shafts laterally toward and away from the power shaft to cause proper engagement of the power transmitting elements, said means including slide members journaling the driven shafts and formed with notches, bell crank levers each having one arm engaged in the notch of one of the members, a foot pedal controlled rock shaft, crank arms on the rock shaft, yieldable connection between the crank arms and the free arms of the bell crank levers, a rotatable steering element, and operating means between the steering element and the connections between the crank arms and bell crank levers whereby turning of the steering element will cause swinging of one or the other of the driven shafts.

5. In a transmission mechanism, a transmission shaft, a power transmitting drum including a hub adapted for connection with the said shaft, said hub having an annular flange projecting therefrom between its ends, a plurality of friction disks of different diameters mounted about the hub and one of them recessed to receive the flange, and a plurality of securing elements passed through the disks and flange, whereby the hub and disks will turn as a unit.

6. In a transmission mechanism, a power shaft, a pair of driven shafts, a friction disk on the power shaft, friction disks on the driven shaft adapted in one position to be in alinement with the disk of the power shaft and be spaced therefrom at either side, friction rollers supported at either side and below the disc of the power shaft, friction rollers supported at either side and above the same disk, and means for bringing all of said friction rollers into engagement with such friction disk and with the adjacent friction disks of the driven shafts.

7. In a transmission mechanism, a power shaft, a pair of driven shafts at either side of the power shaft, friction disks on the shafts, the disk on the power shaft being disposed between and in spaced relation to the disks on the driven shafts, resilient supporting brackets, yokes supported by the brackets with their arms extending upon opposite sides of the disk of the power shaft, one yoke being disposed at either side of such shaft, friction rollers supported by the free ends of the yokes, and means for raising the yokes to bring the friction rollers into engagement with the disk of the power shaft and adjacent disks of the driven shafts.

8. In a transmission mechanism, a power shaft, a pair of driven shafts at either side of the power shaft, friction disks on the shafts, the disk on the power shaft being disposed between and in spaced relation to the disks on the driven shafts, resilient supporting brackets, yokes supported by the brackets with their arms extending upon opposite sides of the disk of the power shaft, one yoke being disposed at either side of such shaft, friction rollers supported by the free ends of the yokes, bell crank levers pivoted to the yokes, supplemental yokes swingingly supported each by one arm of one of the bell crank levers, friction rollers carried by the supplemental yokes, and means for simultaneously swinging both bell crank levers to force all of the friction rollers into engagement with the friction disks.

In testimony whereof I affix my signature.

JOSEPH O. MICHAUD. [L. S.]

Copies of this patent may be obtained for five cents each, by addressing the "Commissioner of Patents, Washington, D. C."